US007285347B2

(12) United States Patent
Song et al.

(10) Patent No.: US 7,285,347 B2
(45) Date of Patent: Oct. 23, 2007

(54) ANODE-SUPPORTED FLAT-TUBULAR SOLID OXIDE FUEL CELL STACK AND FABRICATION METHOD OF THE SAME

(75) Inventors: Rak-Hyun Song, Taejon (KR); Dong-Ryul Shin, Taejon (KR); Jong-Hee Kim, Choongnam (KR)

(73) Assignee: Korea Institute of Energy Research, Taejon (KR)

( * ) Notice: Subject to any disclaimer, the term of this patent is extended or adjusted under 35 U.S.C. 154(b) by 354 days.

(21) Appl. No.: 10/700,025

(22) Filed: Nov. 3, 2003

(65) Prior Publication Data

US 2005/0095483 A1    May 5, 2005

(51) Int. Cl.
*H01M 8/10*    (2006.01)
(52) U.S. Cl. .......................... 429/31; 429/33
(58) Field of Classification Search ................. 429/31, 429/33, 38, 41, 45
See application file for complete search history.

(56) References Cited

U.S. PATENT DOCUMENTS

| 4,751,152 | A | | 6/1988 | Zymboly | |
|---|---|---|---|---|---|
| 4,913,982 | A | * | 4/1990 | Kotchick et al. | ............. 429/12 |
| 5,516,597 | A | * | 5/1996 | Singh et al. | ................... 429/30 |
| 5,993,985 | A | | 11/1999 | Borglum | |
| 6,048,636 | A | | 4/2000 | Naoumidis et al. | |
| 6,207,311 | B1 | | 3/2001 | Baozhen et al. | |
| 6,248,468 | B1 | * | 6/2001 | Ruka et al. | ................... 429/40 |
| 2005/0037252 | A1 | * | 2/2005 | Pham | ........................ 429/31 |

OTHER PUBLICATIONS

Fabrication and Characteristics of Anode-Supported Flat-Tube Solid Oxide Fuel Cell; Jong-Hee Kim, Rak-Hyun Song et al.; Journal of Power Sources (vol. 122); May 7, 2003; pp. 138-143.*

* cited by examiner

*Primary Examiner*—Mark Ruthkosky
*Assistant Examiner*—Keith Walker
(74) *Attorney, Agent, or Firm*—DeLio & Peterson, LLC; Peter W. Peterson

(57) ABSTRACT

An anode-supported flat-tubular solid oxide fuel cell stack includes a plurality of fuel cells and a plurality of connector plates. Each of the fuel cells includes a supported tube having semi-cylinder parts and plate parts, a connector coated on an upper plate of the supported tube as a way to be positioned at the center of the upper plate, an electrolyte layer partly coated on an external surface of the supported tube except for a portion of the supported tube coming into contact with the connector, and an air electrode coated on an external surface of the electrolyte layer. Each of the connector plates includes a lower connector plate, middle connector plates, and an upper connector plate. A plurality of gas channels are formed on the middle and lower connector plates. The anode-supported flat-tubular solid oxide fuel cell stack has a large capacity, improved power density, and reduced production costs.

7 Claims, 8 Drawing Sheets

ANODE-SUPPORTED FLAT-TUBULAR SOLID OXIDE FUEL CELL STACK AND FABRICATION METHOD OF THE SAME

BACKGROUND OF THE INVENTION

1. Field of the Invention

The present invention pertains to a flat-tubular solid oxide fuel cell stack using an anode as a supported body and a method of fabricating the stack. More particularly, the present invention relates to an anode-supported flat-tubular solid oxide fuel cell stack, which includes an anode-supported tube having semi-cylinder parts and plate parts, thereby having a combined structure of a tube-type and a plate-type anode-supported body, and a method of fabricating the stack. The anode-supported flat-tubular solid oxide fuel cell stack is advantageous in that fuel cells constituting the stack are easily sealed, and have excellent resistance to heat stress and improved power density per unit area.

2. Description of the Related Art

A fuel cell is a highly efficiency clean generator, in which hydrogen contained in a hydrocarbon based material such as natural gas, coal gas, or methanol, is electrochemically reacted with oxygen contained in air to produce electric energy. It is classified into alkaline, phosphoric acid, molten carbonate, solid oxide, and polymer fuel cells.

Generally, the phosphoric acid fuel cell using a phosphoric acid electrolyte is referred to as a first generation fuel cell, in which hydrogen gas mostly containing hydrogen reformed from fossil fuel and oxygen contained in air are used as fuel, the high temperature molten carbonate fuel cell using molten carbonate as the electrolyte and operating at about 650° C. is referred to as a second generation fuel cell, and the solid oxide fuel cell (SOFC) operating at a relatively higher temperature and generating the most efficient electricity is referred to as a third generation fuel cell.

The third generation fuel cell, the solid oxide fuel cell, was developed after the phosphoric acid fuel cell (PAFC) and the molten carbonate fuel cell (MCFC), but it is expected that the solid oxide fuel cell will be rapidly commercialized in subsequent to PAFC and MCFC due to a rapid development of material technology. Additionally, the solid oxide fuel cell is operated at a high temperature ranging from 600 to 1000° C., and has advantages in that it is the most efficient of existing fuel cells, there are few pollutants discharged, a fuel reformer is not necessary, and a combined power generation is feasible.

The solid oxide fuel cell is generally classified into a tube type fuel cell, a plate type fuel cell, and a single body type fuel cell according to a shape of the solid oxide fuel cell. Of them, currently, the tube and plate type fuel cell are mostly studied, a technology of the tube type fuel cell is considered as the most advanced technology, and a study of the plate type fuel cell is more advanced than that of the single body type fuel cell. As for the tube type fuel cell, an air electrode support type fuel cell has been developed in the USA and Japan, and a self-supporting film type fuel cell comprising an electrolyte as a support and an anode-supported plate fuel cell has been developed as the plate type fuel cell.

The plate type solid oxide fuel cell has a higher current density than a disk type fuel cell, but has disadvantages in that a large-sized plate type fuel cell necessarily needed to produce a large capacity fuel cell is difficult to produce using the plate type solid oxide fuel cell due to several problems, such as sealing gas and thermal shock due to a difference of thermal equilibrium coefficient between constituents of the fuel cell.

In comparison with the plate type solid oxide fuel cell, the tube type solid oxide fuel cell is advantageous in that unit cells constituting the stack are easily sealed, resistance to heat stress and mechanical strength of the stack are high, thereby the tube type solid oxide fuel cell is considered to be an excellent technology by which the large-sized fuel cell can be most easily produced. However, the tube type solid oxide fuel cell has disadvantages in that the tube type solid oxide fuel cell has a lower power density per unit area than the plate type solid oxide fuel cell, and the production costs of the tube type solid oxide fuel cell are relatively high.

Meanwhile, a conventional tube type fuel cell is an air electrode-supported fuel cell using an air electrode as the support of the fuel cell, and the production costs of the fuel cell are increased because raw materials for the air electrode such as La and Mn, are very expensive, and production of LSM ($LaSrMnO_3$) is difficult. In addition, the unit cell is low in mechanical strength and does not withstand impact because the air electrode acting as the support is made of ceramics while an anode is made of cermet consisting of metals and ceramics.

Furthermore, an electrolyte layer is coated on a surface of the air electrode-supported tube according to a process requiring high coating costs during fabrication of the conventional air electrode-supported tubular solid oxide fuel cell, thus the conventional air electrode-supported tubular solid oxide fuel cell is disadvantageous in terms of economic efficiency.

In other words, the air electrode is fragile because the air electrode is made of high-priced ceramics, such as La, which is used as the support in the conventional air electrode-supported tubular solid oxide fuel cell, the strength of the air electrode is reduced due to a chemical reaction, in the ceramic structure constituting the air electrode, at high temperatures, and the fuel cell price is increased because the electrolyte layer is formed on the surface of the air electrode by use of the very costly EVD process.

Furthermore, the electrolyte and the anode formed on a surface of the sintered air electrode-supported tube are co-sintered at high temperatures, and thus activity of the air electrode is reduced and an efficiency of the fuel cell is lowered.

To avoid the above disadvantages of the air electrode-supported solid oxide fuel cell, the anode-supported tubular solid oxide fuel cell using the anode as the support has been developed. The anode-supported tube used in the anode-supported tubular solid oxide fuel cell satisfies characteristics required by the electrode as well as acts as the support, and is advantageous in that co-sintering is feasible because reactivity is low between the support and the electrolyte layer, and a stable fuel cell stack can be fabricated due to high mechanical strength of the anode.

In addition, the anode-supported tube has sufficient pores therein, a fuel provision is not limited because a continuous pore distribution is formed in the anode-supported tube, and current flow is smooth due to high electric conductivity and production costs of the fuel cell are low.

When the anode-supported tubular solid oxide fuel cell is produced, the most important factor affecting productivity is a process of coating the electrolyte layer on the surface of the anode-supported tube.

In detail, a conductivity of YSZ, which is most widely used as the electrolyte in the solid oxide fuel cell, is about $10^{-1}$ S/cm at 1000° C., and the electrolyte layer should have a thickness of about 30 μm or lower and be very dense because the lower an operating temperature of the fuel cell is, the lower the conductivity is or the higher a resistance is.

The anode-supported tubular solid oxide fuel cell has a disadvantage in that the very thin and dense electrolyte layer should be formed on the surface of the porous anode-supported tube with a wide surface area. Therefore, recently, many studies have been initiated in order to develop a process of efficiently forming an excellent electrolyte layer.

When the electrolyte layer is formed by a physical and chemical vapor deposition process using a vacuum such as an EVD process or a plasma spray coating process, a dense and thin electrolyte layer can be formed, but equipment used to form the electrolyte layer is undesirably large and the reaction time is excessively long. In addition, the above processes are not suitable to produce the fuel cell in commercial quantities because a few of the unit cell are deposited by the electrolyte at one time.

SUMMARY OF THE INVENTION

Therefore, the present invention has been made keeping in mind the above problems occurring in the prior art, and an aspect of the present invention is to provide an anode-supported flat-tubular solid oxide fuel cell stack, which includes an anode-supported tube having semi-cylinder parts and plate parts, thereby securing advantages of an anode-supported tubular solid oxide fuel cell stack and improving a relatively low power density of the anode-supported tubular solid oxide fuel cell stack, and a method of fabricating the anode-supported flat-tubular solid oxide fuel cell stack.

Additional aspects and/or advantages of the invention will be set forth in part in the description which follows and, in part, will be obvious from the description, or may be learned by practice of the invention.

The above and/or other aspects are achieved by providing an anode-supported flat-tubular solid oxide fuel cell stack which is provided with an anode-supported tube including semi-cylinder parts and plate parts. At this time, the plate parts are positioned parallel to each other in the anode-supported tube.

BRIEF DESCRIPTION OF THE DRAWINGS

The above and other aspects, features and other advantages of the present invention will be more clearly understood from the following detailed description taken in conjunction with the accompanying drawings, in which:

FIGS. 6A and 6B illustrate an Ni-distribution image in a Ni/YSZ cermet anode of the unit fuel cell constituting the anode-supported flat-tubular solid oxide fuel cell stack according to the present invention, in which FIG. 6A is a SEM picture of the Ni/YSZ cermet anode and FIG. 6B is an X-ray picture of the Ni/YSZ cermet anode;

FIGS. 10A and 10B are graphs showing the voltage-current characteristic changed according to an operation temperature and a fuel of the unit fuel cell, in which FIG. 10A is a graph showing a voltage as a function of a current density for the unit fuel cell operated at 750° C., and FIG. 10B is a graph showing a voltage as a function of a current density for the unit fuel cell operated at 850° C.;

DETAILED DESCRIPTION OF THE INVENTION

Figure 1:
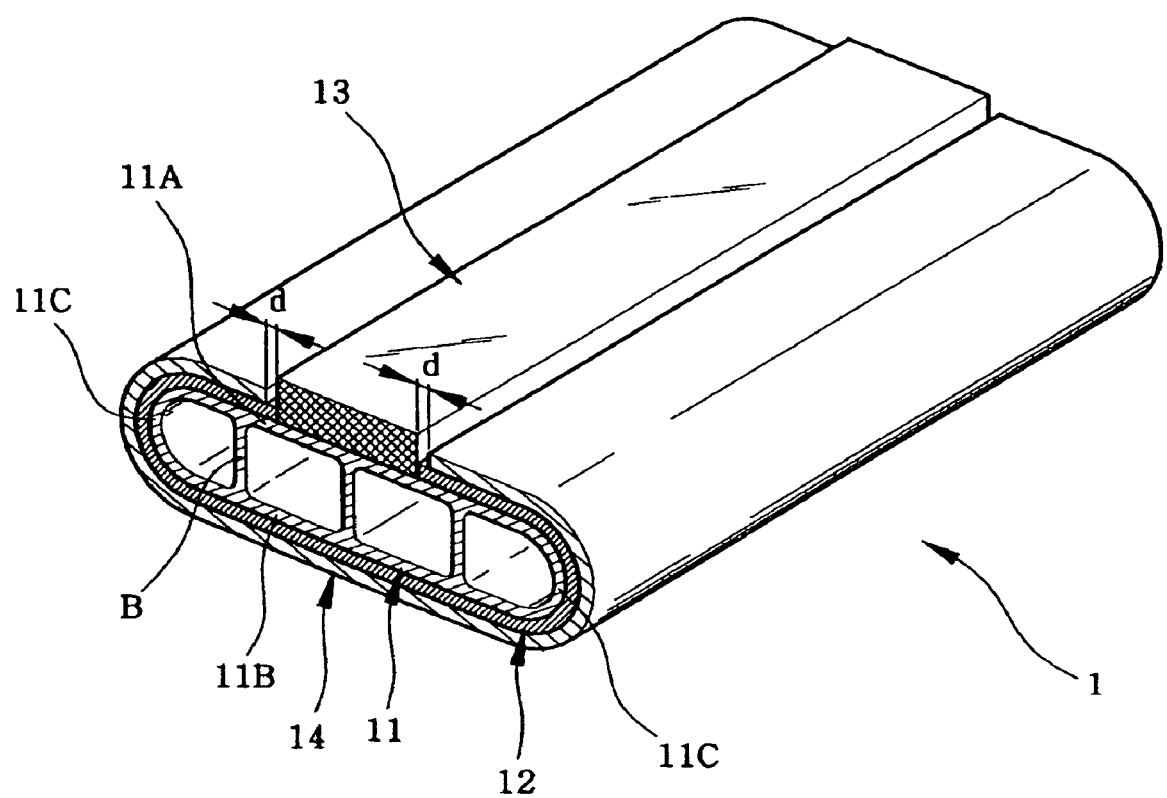
FIG. 1 is a perspective view of a unit fuel cell constituting an anode-supported flat-tubular solid oxide fuel cell stack according to the present invention.

Reference will now be made in detail to the present preferred embodiments of the present invention, examples of which are illustrated in the accompanying drawings, wherein like reference numerals refer to like elements throughout.

An anode-supported flat-tubular solid oxide fuel cell stack according to the present invention is characterized in that it is provided with two or more fuel cells and three or more connector plates for desirably arranging the fuel cells and electrically connecting the fuel cells to each other. Additionally, the stack has the flat-tubular fuel cells to secure advantages of a plate-type and a tube-type fuel cell. Further, a connector is coated on an external surface of an supported tube according to a wet process such as a plasma spray coating process, or a slurry coating process to electrically connect the fuel cells to the connector plates.

A flat-tubular unit fuel cell constituting the stack according to the present invention includes semi-cylinder parts and plate parts, and the connector plates serve to stack the flat-tubular fuel cells and electrically connect the flat-tubular fuel cells to each other.

With reference to FIG. 1, an anode-supported tube 11 acting as a supported body of the unit fuel cell 1 constituting the anode-supported flat-tubular solid oxide fuel cell stack includes an upper and a lower plate 11A and 11B positioned parallel to each other, and semi-cylinders 11C integrally combined with the upper and lower plate 11A and 11B, thus having a sectional shape with a combined structure of two straight lines and two semi-circles.

Additionally, the upper plate 11A and lower plate 11B constituting the anode-supported tube 11 are supported by at least two bridges (B) integrally combined with the upper plate 11A and lower plate 11B as a way to form at a right angle to the upper and lower plate 11A and 11B.

In other words, the anode-supported tube 11 constituting the unit fuel cell 1 includes the upper and lower plate 11A and 11B and the semi-cylinders 11C in such a way that the semi-cylinders 11C are integrally combined with the upper and lower plate 11A and 11B to the anode-supported tube 11 to have a sectional shape with the combined structure of the two straight lines and two semi-circles. At this time, the semi-cylinders 11C act as a bridge (B) to connect the upper and lower plate 11A and 11B to each other.

Furthermore, the bridges (B) serve to reduce a movement distance of a current and internal resistance of the unit fuel cell 1 to allow the current to smoothly flow through the stack to increase a power density of the stack, and improve the strength of the anode acting as the supported body, thereby the durability of the anode-supported flat-tubular solid oxide fuel cell stack is improved.

Therefore, each unit fuel cell constituting the anode-supported flat-tubular solid oxide fuel cell stack of the present invention includes the supported tube 11, a connector 13 with a rectangular section longitudinally coated on the upper plate 11A of the supported tube 11 as a way to be positioned at the center of the upper plate 11A, an electrolyte layer 12 partly coated on an external surface of the supported tube 11 except for a portion of the supported tube 11 coming into contact with the connector 13, and an air electrode 14 coated on an external surface of the electrolyte layer 12 in such a way that both its ends are respectively separated from both sides of the connector 13 by a predetermined distance (d).

To sum up, each unit fuel cell constituting the stack of the present invention has a combined structure of a tube-type and a plate-type anode-supported body.

Figure 2:
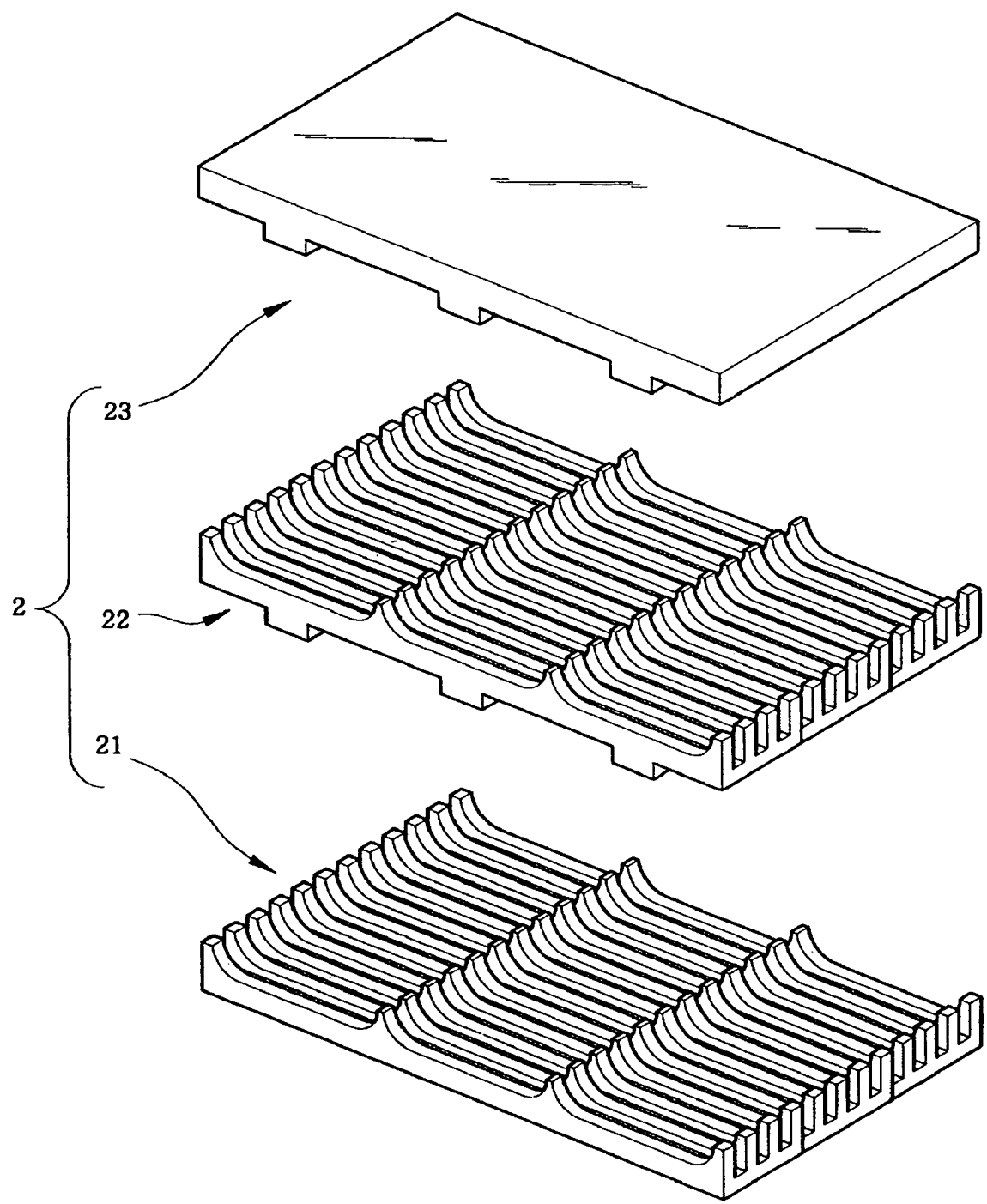
FIG. 2 illustrates perspective views of an upper connector plate, a middle connector plate, and a lower connector plate constituting the anode-supported flat-tubular solid oxide fuel cell stack according to the present invention.
Figure 3:
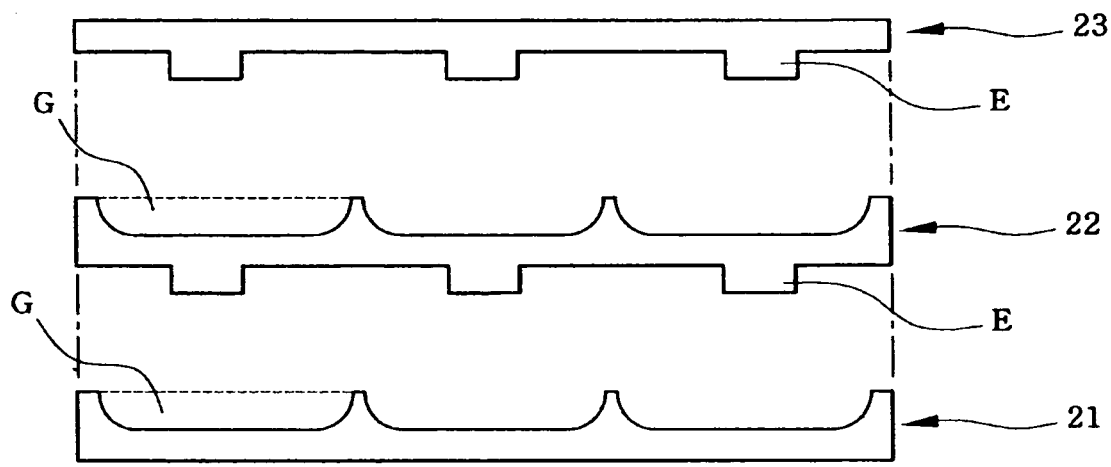
FIG. 3 illustrates front views of the upper connector plate, middle connector plate, and lower connector plate constituting the anode-supported flat-tubular solid oxide fuel cell stack according to the present invention.
Figure 4:
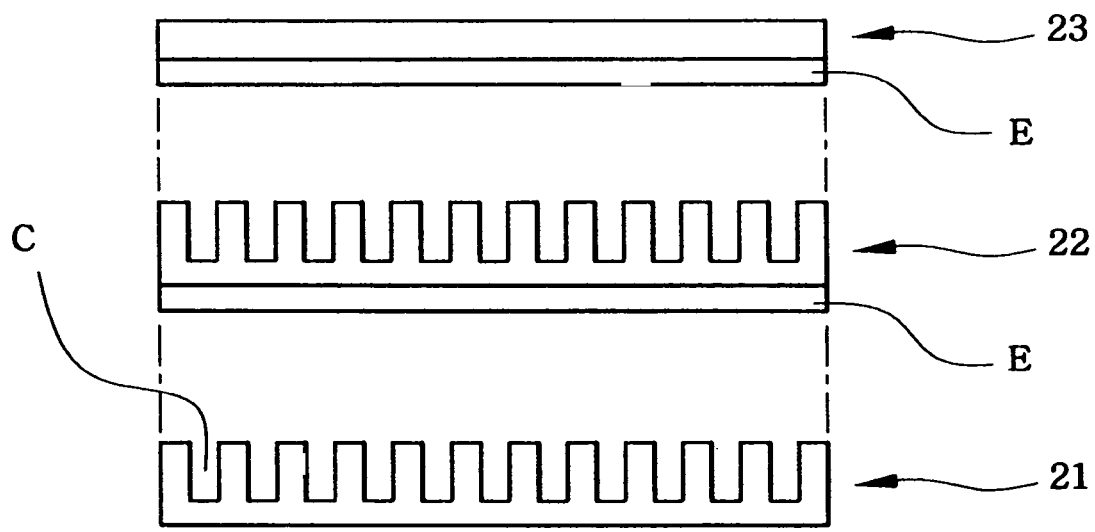
FIG. 4 illustrates side views of the upper connector plate, middle connector plate, and lower connector plate constituting the anode-supported flat-tubular solid oxide fuel cell stack according to the present invention.

Referring to FIGS. 2 to 4, a connector plate 2 with a rectangular section, made of a metal, and includes a lower connector plate 21, one or more middle connector plates 22, and an upper connector plate 23, is installed in the anode-supported flat-tubular solid oxide fuel cell stack so as to arrange the fuel cells in two or more rows and stack the fuel cells in two or more layers.

A plurality of grooves (G) are formed parallel to each other on upper surfaces of the lower connector plate 21 and middle connector plates 22 so as to receive the flat-tubular fuel cells. At this time, a depth of each of the grooves (G) is less than a height of the each unit fuel cell 1 by 50% or less. Further, a plurality of connector protrusions with rectangular cross-section (E) are formed on portions of lower surfaces of the upper connector plate 23 and middle connector plates 22 corresponding in position to the centers of the grooves (G) as a way to be extruded parallel to the grooves (G) and come into contact with upper surfaces of connectors 13 of the fuel cells 1. An upper surface of the upper connector plate 23 and a lower surface of the lower connector plate 21 are all flat, and are connected to stack electrodes of the present invention.

Furthermore, a plurality of gas channels (C) with a rectangular section are formed on the upper surfaces of the lower connector plate 21 and middle connector plates 22 as a way to be at a right angle to the grooves (G). In this regard, the gas channels (C) are positioned parallel to each other, and act as an air flowing path.

The fuel cells 1 are installed in the grooves (G) of the lower connector plate 21, and a first middle connector plate 22 is covered on the fuel cells 1 in such a way that the connector protrusions (E) of the first middle connector plate 22 come into contact with the connectors 13 of the fuel cells 1.

Additionally, the fuel cells 1 are installed in the grooves (G) of the first middle connector plate 22, and a second middle connector plate 22 is then covered on the fuel cells 1. The above procedure is repeated to stack a plurality of middle connector plates 22 and the fuel cells 1, and finally, the upper connector plate 23 is layered on the fuel cells 1 in such a way that the connector protrusions (E) of the upper connector plate 23 come into contact with the connectors 13 of the fuel cells 1, thereby accomplishing the anode-supported flat-tubular solid oxide fuel cell stack of the present invention.

Figure 5:
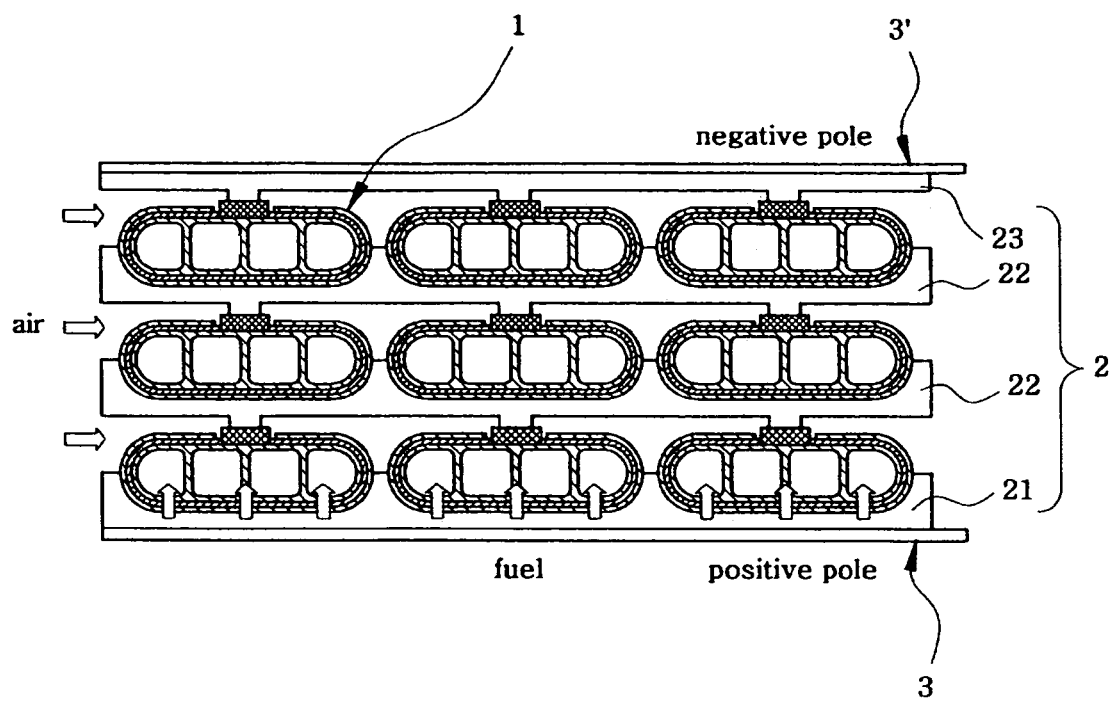
FIG. 5 is a sectional view of the anode-supported flat-tubular solid oxide fuel cell stack according to the present invention.

In other words, the connector plate 2 and fuel cells 1 are stacked in the order of the lower connector plate 21, the fuel cells 1, the middle connector plate 22, the fuel cells 1, the middle connector plate 22 . . . , the fuel cells 1, the middle connector plate 22, the fuel cells, and the upper connector plate 23, as shown in FIG. 5. At this time, the stack electrodes 3, 3' are connected to the lower surface of the lower connector plate 21 and the upper surface of the upper connector plate 23, respectively.

In this regard, the number of the grooves (G) of the connector plates 2 on which the fuel cells 1 are installed, the connector protrusions (E), and the middle connector plates 22 depends on a wattage obtained from the anode-supported flat-tubular solid oxide fuel cell stack.

As described above, the anode-supported flat-tubular solid oxide fuel cell stack is structured such that hydrogen gas flows in the supported tubes 11 of the fuel cells 1 and air flows roughly perpendicular to a flow direction of hydrogen through the gas channels (C) of the connector plates 2. In this regard, the fuel cells 1 are arranged parallel to each other in the grooves (G) of the lower connector plate 21 and middle connector plates 22 to collect a current formed at an air electrode, and an anode is connected in series to the air electrode through a flat upper surface of the upper connector plate 21 whose connector protrusions (E) come into contact with the connectors of the fuel cells 1 installed in the middle connector plate 22 located at the highest position, and through a flat lower surface of the lower connector plate 23.

A detailed description will be given of a method of fabricating the flat-tubular fuel cells and connector plates.

The method of fabricating an anode-supported flat-tubular solid oxide fuel cell stack, includes extruding and drying a paste, containing yttria-stabilized-zirconia (hereinafter, referred to as "YSZ") powder, for a supported tube, pre-sintering the resulting paste at 1200 to 1400° C. to produce the flat-tubular type of supported tube; coating a band-shaped organic protective layer on a center of an upper plate of the supported tube, dipping the resulting supported tube into an electrolyte slurry containing YSZ powder to coat the electrolyte slurry on an external surface of the supported tube, drying the electrolyte slurry, removing the band-shaped organic layer and repeatedly degreasing the electrolyte slurry at 200 to 450° C.; co-sintering the resulting supported tube at 1300 to 1500° C.; coating perovskite powder in which Ca, Sr, Mg, Co, or Al is added to $LaCrO_3$ on a portion of the supported tube on which the organic layer is removed according to a plasma spray coating process or a slurry coating process to form a ceramic connector on the supported tube; and coating another organic layer on the ceramic connector, wet-dipping the resulting supported tube into an air electrode slurry containing $LaSrMnO_3$ powder to coat the air electrode slurry on an electrolyte layer, removing the organic layer from the ceramic connector, and sintering the air electrode slurry at 1150 to 1250° C. to accomplish a unit fuel cell.

At this time, the electrolyte layer 12 and the connector 13 must be tightly attached to an external surface of the supported tube 11 so as to prevent reactant gases from being mixed with each other, and the connector 13 must be separated from both ends of the air electrode by a predetermined distance (d) so as to prevent the connector 13 formed on the supported tube acting as the anode from electrically have a short circuit to the air electrode formed on the electrolyte layer.

When the fuel cells are fabricated, carbon powder acting as a pore forming agent is added in an amount of 10 to 50 vol % to YSZ powder containing 30 to 60 vol. % Ni, and 15 to 30 wt % distilled water, 5 to 20 wt % organic binding agent, 3 to 10 wt % plasticizer, and 1 to 7 wt % lubricant are added to a mixture of the carbon powder and YSZ powder based on a total amount of the mixture to produce a paste for the supported tube. The paste is then seasoned to allow moisture to be uniformly distributed in the paste. At this time, an electric conductivity of a Ni/YSZ cermet depends on the Ni content. When the Ni content is 30 vol % or more, the electric conductivity is improved because the contact between the nickel particles is improved. However, when the Ni content is less than 30 vol %, the electronic conductivity is greatly reduced.

As described above, the electric conductivity of the anode is improved by increasing the Ni content, but when the Ni content is more than 60 vol %, a thermal expansion coefficient of the Ni/YSZ cermet is increased, thus the Ni/YSZ cermet is different from other constituents of the anode-supported tubular solid oxide fuel cell in the thermal expansion coefficient, and cracks usually occur in the fuel cell during the production of the fuel cells or while evaluating fuel cell performance. According to the present invention, therefore, the YSZ powder preferably contains 30 to 60 vol % of Ni metal so that a thermal expansion coefficient difference between the Ni/YSZ cermet and other constituents of the anode-supported tubular solid oxide fuel cell is minimized, and the anode has the sufficient electric conductivity.

In addition, the carbon powder contained in the powder for the anode-supported tube is added as the pore forming agent to an inside of the anode-supported tube in an amount of 10 to 50 vol % during the pre-sintering step of the anode-supported tube and after the step of extruding into the anode-supported tube. For example, when the amount of the carbon powder is less than 10 vol %, the anode does not operate normally because the porosity in the anode-supported tube is reduced. On the other hand, when the amount is more than 50 vol %, the strength of the anode-supported tube is reduced because the porosity is greatly increased.

Furthermore, when the amount of distilled water is less than 15 wt %, the extrusion property of the paste is reduced because the paste contains insufficient moisture. On the other hand, when the amount of distilled water is more than 30 wt %, a shape of an extrudate is easily deformed. Further, when the amount of the organic binding agent is less than 5 wt %, cracks are formed in the anode-supported tube or the anode-supported tube has poor strength, but when the amount of the organic binding agent is more than 20 wt %, it is difficult to control pores of a finally sintered body.

Additionally, when the amount of the plasticizer is less than 3 wt %, it is difficult to uniformly mold raw powder and the organic binding agent during molding the mold raw powder and organic binding agent, but when the amount of the plasticizer is more than 10 wt %, a shape of the extrudate is easily deformed. Moreover, when the amount of the lubricant is less than 1 wt %, the extrusion property of the paste is reduced because friction increases during the extruding of the paste. However, when the amount of lubricant exceeds 7 wt %, a density of the extrudate is reduced because an insufficient molding pressure is applied to the paste due to an excess lubricating working.

Meanwhile, when a pre-sintering temperature is less than 1200° C. after the paste for the supported tube is extruded and dried, the anode-supported tube does not have enough strength to endure the step of forming the electrolyte layer because the paste is undesirably sintered to secure poor impact resistance. While, when the temperature is more than 1400° C., the anode supported tube is seriously shrunk, thus the unit fuel cell may be cracked due to a difference in the shrinkage percentage of constituents of the fuel cell during the co-sintering of the paste and after the anode-supported tube is coated with the slurry.

The electrolyte slurry includes 60 to 95 wt % organic solvent such as 2-propanol and toluene, 5 to 40 wt % YSZ powder, and an additive. For example, when a concentration of the YSZ powder is less than 5 wt %, a slurry layer coated on an external surface of the anode-supported tube is too thin to form a dense electrolyte layer when dipping the anode-supported tube into the slurry. On the other hand, when the concentration of the YSZ powder is more than 40 wt %, the slurry layer coated on the anode-supported tube is too thick to maintain a uniform slurry layer.

As described above, the electrolyte slurry contains the YSZ powder and the additive. In detail, the electrolyte slurry contains 5 to 12 parts by weight of binding agent, 5 to 15 cc plasticizer, 1 to 3 cc homogenizing agent, and 1 to 3 cc dispersing agent based on 100 g of the YSZ powder as the additive. In this regard, if an amount of the additive, such as the binding agent, plasticizer, homogenizing agent, and dispersing agent deviates from the above ranges, the slurry is not useful in the present invention.

In addition, the anode-supported tube is wet-dipped into the electrolyte slurry two to five times according to a concentration of YSZ powders in the electrolyte slurry to coat the surface of the anode-supported tube with the slurry layer. If a dipping number is outside the above range, an electrolyte layer with a suitable thickness cannot be obtained. Furthermore, the resulting slurry layer is dried at 200 to 450° C. and co-sintered at 1300 to 1500° C. When the slurry layer is dried at less than 200° C., the dense electrolyte layer is not formed because the additive is not sufficiently removed. On the other hand, when a drying temperature of the slurry layer is more than 450° C., the heat distortion occurring in the slurry layer reduces a quality of the electrolyte layer. Further, when the slurry layer is co-sintered at less than 1300° C., the electrolyte layer is not densely formed, but when the slurry layer is co-sintered at more than 1500° C., performance of the anode-supported tube is reduced because NiO particles are excessively grown.

The connector formed on the external surface of the anode-supported tube from which an organic layer is removed consists of perovskite powder, and it is preferable that lumps are formed on the anode-supported tube in accordance with a plasma spray coating process after the perovskite powder with a particle size of 0.1 to 2 μm is converted into lumps with a size of 10 to 60 μm according to a spray drying process. Alternatively, after the powder forms lumps according to a wet-slurry process, the lumps may be formed on the anode-supported tube according to a dipping process.

$LaSrMnO_3$ powder, mixed powder of $LaSrMnO_3$ powder and 20 to 50 wt % YSZ powder, and $LaSrCoFeO_3$ powder are used as a starting material to form an air electrode slurry. Each powder is mixed with 50 to 75 wt % organic solvent and 5 to 40 wt % additive to produce three kinds of air electrode slurries. At this time, an amount of the each powder is 10 to 30 wt %. If amounts of the above materials deviate from the above ranges, the air electrode slurry is not useful in the present invention.

The slurry containing the $LaSrMnO_3$ powder, the slurry containing the mixed $LaSrMnO_3$ powder (containing the 20 to 50 wt % YSZ powder), and the slurry containing the LaSrCoFeO$_3$ powder each are coated once or more on the electrolyte layer, dried at 200 to 450° C., and sintered at 1150 to 1250° C. For example, when a drying temperature is less than 200° C., the air electrode layer is not densely formed because the additive is not sufficiently removed. On the other hand, when the drying temperature is more than 450° C., the air electrode layer is separated from the electrolyte layer because a slurry layer is deformed due to heat, thereby a quality of the fuel cell is reduced. Furthermore, when a sintering temperature is less than 1150° C., a diffusion interface layer is reduced because the air electrode slurry is insufficiently sintered, but when the sintering temperature is more than 1250° C., Mn elements in the air electrode are destructed and structural properties of the air electrode are degraded because the air electrode slurry is excessively sintered.

Meanwhile, a method of producing the connector plate for layering the fuel cells and connecting the fuel cells to each other, includes the following steps:

forming grooves (G), gas channels (C), and connector protrusions (E) on an upper connector plate, a middle connector plate, and a lower connector plate made of a metal plate selected from the group consisting of a Fe—Cr based alloy such as ducrolloy, SUS 310S, or SUS 430 having a relatively small thermal expansion coefficient and excellent heat resistance at 600 to 800° C., at which the fuel cells are operated, a Fe—Cr alloy containing LaCrO$_3$, Y$_2$O$_3$, or La$_2$O$_3$, a Cr alloy, and a Ni alloy;

polishing surfaces of the metal plate;

mixing ceramic powder having electronic conductivity such as LaSrMnO$_3$ or La$_{1-X}$Ca$_X$Cr$_{1-Y}$O$_3$, a binding agent (PVB), a plasticizer (dibutyl phthalate), a dispersing agent (fish-oil), a homogenizing agent (triton-X), and a solvent (toluene or 2-propanol) with each other, and ball-milling the resulting mixture to produce a slurry for the connector plate;

dipping the metal plate into the slurry for the connector plate, and drying the resulting metal plate two times or more to coat the slurry for the connector plate on the metal plate;

sintering the slurry containing LaSrMnO$_3$ at 1100 to 1300° C. under oxygen partial pressure of $10^{-10}$ to $10^{-3}$ atm, or the slurry containing La$_{1-X}$Ca$_X$Cr$_{1-Y}$O$_3$ at 1150 to 1350° C. under oxygen partial pressure of $10^{-3}$ atm or lower to form a ceramic coating layer on the metal plate.

In this regard, the slurry for the connector plate contains 20 to 50 wt % LaSrMnO$_3$ or La$_{1-X}$Ca$_X$Cr$_{1-Y}$O$_3$, 0.5 to 10 wt % binding agent, 0.2 to 2 wt % solvent, and 0.2 to 5 wt % additive such as the plasticizer, dispersing agent, and homogenizing agent.

For example, when a content of a ceramic powder with the electronic conductivity such as LaSrMnO$_3$ or La$_{1-X}$Ca$_X$Cr$_{1-Y}$O$_3$ in the slurry is less than 20 wt %, the ceramic coating layer on the metal plate is thin and oxygen ions in the atmosphere are diffused into metal groups of the ceramic powder to allow the ceramic coating layer to have low oxidation resistance. On the other hand, when the content of the ceramic powder is more than 50 wt %, a slurry layer between channels on the metal plate has non-uniform thickness because the fluidity of the slurry is reduced. Additionally, when a binding agent content in the slurry is less than 0.5 wt %, the slurry layer on the metal plate has non-uniform thickness during sintering the slurry layer because a binding force of the ceramic powder to the metal plate is greatly reduced after the ceramic powder is dried. While, when the binding agent content is more than 10 wt %, the fluidity of the slurry is reduced and it is difficult to densely form the slurry layer after the slurry layer is sintered.

Furthermore, when a solvent content in the slurry is less than 0.2 wt %, the binding agent is not sufficiently dissolved in the slurry and the dispersibility of the slurry is reduced because the fluidity of the slurry is reduced. But, when the solvent content is more than 2 wt %, it is difficult to form a uniform slurry coating layer on the metal plate.

In the case of using the slurry containing La$_{1-X}$Ca$_X$Cr$_{1-Y}$O$_3$, it is preferable that X is more than 0 and up to 0.4, and Y has a range of 0 to 0.5. When X is 0, the metal plate is readily deformed due to heat because the slurry containing La$_{1-X}$Ca$_X$Cr$_{1-Y}$O$_3$ is sintered at an increased temperature. On the other hand, when X is more than 0.4, the slurry coating layer is easily exfoliated from the metal plate because of a thermal expansion coefficient difference between the metal plate and the slurry coating layer.

Additionally, the slurry containing LaSrMnO$_3$ and the slurry containing La$_{1-X}$Ca$_X$Cr$_{1-Y}$O$_3$ are sintered under different oxygen partial pressures and temperatures as described above. In this regard, when the slurry containing LaSrMnO$_3$ is sintered under the oxygen partial pressure less than $10^{-10}$ atm, the conductivity of the slurry is reduced because of a phase separation phenomenon, but when the slurry containing LaSrMnO$_3$ is sintered under the oxygen partial pressure more than $10^{-3}$ atm, the conductivity of the slurry is reduced because metal components in the slurry are excessively oxidized. Further, when the slurry containing LaSrMnO$_3$ is sintered at temperatures less than 1100° C., it is difficult to sufficiently sinter the slurry, but when the slurry containing LaSrMnO$_3$ is sintered at temperatures higher than 1300° C., the slurry coating layer may be distorted because the metal components in the slurry are deformed due to heat.

Moreover, when the slurry containing La$_{1-X}$Ca$_X$Cr$_{1-Y}$O$_3$ is sintered under the oxygen partial pressure more than $10^{-3}$ atm, the conductivity of the slurry is reduced because the metal components in the slurry are excessively oxidized. Furthermore, when the slurry containing La$_{1-X}$Ca$_X$Cr$_{1-Y}$O$_3$ is sintered at temperatures less than 1150° C., it is difficult to sufficiently sinter the slurry, but when the slurry containing La$_{1-X}$Ca$_X$Cr$_{1-Y}$O$_3$ is sintered at temperatures more than 1350° C., the slurry coating layer may be distorted because the metal components in the slurry are deformed due to heat.

Therefore, after being produced under the above conditions, the connector plates and fuel cells are alternately layered to fabricate the anode-supported flat-tubular solid oxide fuel cell stack according to the present invention.

A better understanding of the present invention may be obtained in light of the following examples which are set forth to illustrate, but are not to be construed to limit the present invention.

Fuel Cell

An anode-supported body was produced using NiO-YSZ powder according to an extrusion process, and anode powder was prepared using NiO (manufactured by Junsei Chemical Co.) and 8 mol % of yttria-stabilized-zirconia (8 YSZ, manufactured by Tosoh Co.) as a way to contain a 40 vol % of Ni/YSZ.

An activated carbon (manufactured by KURARAY Chemical Co.) as a pore forming agent used to make the powder be porous, an organic binder for the extrusion process, a plasticizer, and a lubricant were added to the powder, and a predetermined amount of distilled water was mixed with the resulting powder to properly control viscosity of an extrudate and to uniformly extrude the powder. The resulting powder containing distilled water was then seasoned and extruded.

An extruded substance was repeatedly dried several times in an oven at low temperatures to prevent it from being distorted due to evaporation of a solvent during drying the extruded substance, or to prevent cracks from forming in the extruded substance during drying the extruded substance, and then dried at 120° C. for 24 hours. A dried supported body was then pre-sintered at 1300° C.

Electrolyte and air electrode slurry was produced using an organic additive, such as polyvinyl butyral, Di-n-buthalate, Triton-X, and a fish oil, and an organic solvent such as toluene and 2-propanol. Additionally, an 8 YSZ slurry was repeatedly coated on a supported tube and degreased to form a slurry coating layer with a thickness of about 20 µm according to a slurry dipping coating process. The slurry coating layer was then co-sintered at 1400° C.

$(La_{0.85}Sr_{0.15})_{0.9}MnO_3$ (LSM) powder and $La_{0.65}Sr_{0.4}Co_{0.2}Fe_{0.803}$ (LSCF) powder were synthesized as a material of an air electrode according to a solid state reaction process. Slurry containing a mixture of 40 wt % 8 YSZ and LSM, slurry containing LSM, and slurry containing LSCF were sequentially coated on an electrolyte layer, and then sintered at 1200° C. to accomplish a unit fuel cell.

Porosity and pore size of the anode-supported body were measured using a Mercury porosimeter (Autopore IV 9500 V1.00, Micromeritics), and the distribution of Ni acting as a path of electronics and connectivity between Ni grains in the anode-supported body were confirmed by SEM (Scanning Electron Microscope) and according to a composition analysis method.

A change of voltage of the unit fuel cell was measured with changing of a current density in the unit fuel cell with the use of an electric load and a power supply, thereby performance of the unit fuel cell was evaluated.

At this time, hydrogen as a fuel is fed into the unit fuel cell through a gas manifold made of alumina installed at both ends of the unit fuel cell, and air flows along an external surface of the unit fuel cell. A Pt-mesh and a Ni-felt were used as a current collective body of the air electrode and the current collective body of an anode, respectively.

The slurry containing LSM was coated on an SUS 430 alloy, and sintered at 1200° C. under an Ar-5% $H_2$ gas to produce connector plates to layer a plurality of fuel cells with the connector plates, thereby accomplishing an anode-supported flat-tubular solid oxide fuel cell stack of the present invention. Electric conductivity of each connector plate was evaluated according to a DC 2 terminal process, and a fine structure analysis and a phase analysis of an interface layer were conducted using SEM and XRD.

$La_{0.75}Ca_{0.27}CrO_3$ powder was synthesized as powder for a ceramic connector coated on the anode-supported body according to a Pechini process, and physical properties and sintering characteristics of the $La_{0.75}Ca_{0.27}CrO_3$ powder depending on a sintering condition were analyzed using SEM and XRD.

Additionally, $La(NO_3)_3 \cdot 6H_2O$, $Cr(NO_3)_3 \cdot 6H_2O$, and $Ca(NO_3)_2 \cdot 4H_2O$ were mixed with a small amount of distilled water in predetermined amounts to produce a nitrate solution as a starting material of the powder for the connector. Citric acid and ethylene glycol were mixed with the nitrate solution thus produced in a molar ratio of 1:1:1 at a relatively low temperature and then heated to 70° C. while the resulting mixture is stirred to produce a viscous medium substance in a gel state. The medium substance was then left in a drying furnace at 100° C. for 5 hours to produce a sponge-type resin.

Furthermore, the resin thus produced was crushed after it was carbonized at 250° C. for three hours, and sintered at 950° C. for five hours and subjected to a spray drying process to produce granules with a size of 40 µm. The granules thus produced were coated using an atmospheric plasma spray coating device (manufactured by SULZER METCO Co.) on an anode-supported tube, and a fine structure of a coated layer on the anode-supported tube was observed. At this time, this coated layer was compared with another coated layer produced according to a slurry coating process.

Results

A pre-drying process of the anode-supported body functions to allow a solvent to be uniformly separated from pores of the anode powder and organic additive at relatively low temperatures, thereby preventing the anode-supported body from being distorted. After the above pre-drying process, the resulting anode-supported tube is 1.9 mm in thickness.

Figure 7:
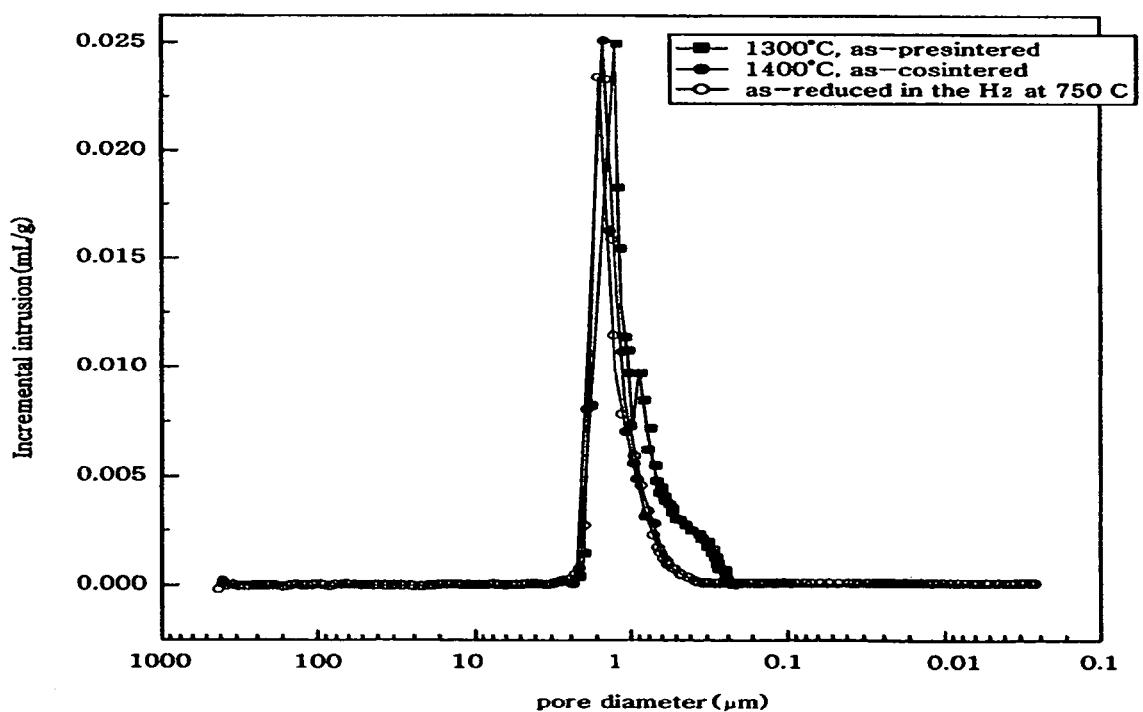
FIG. 7 is a graph showing a pore size distribution of a supported tube of the unit fuel cell according to a sintering condition.
Figure 6:
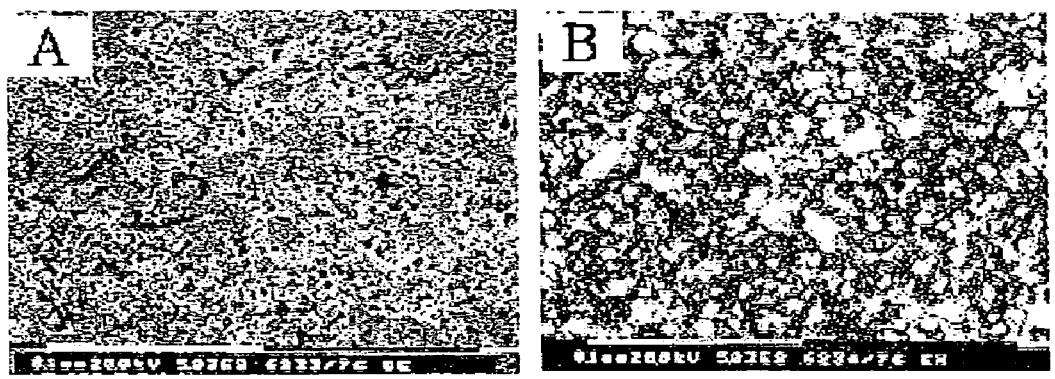

The anode must have a continuous pore distribution so as to smoothly act as a diffusion layer of a fuel gas, and Ni and YSZ acting as a material of the anode must uniformly be distributed in the anode so as to reduce the electrochemical polarization resistance of the anode. Particularly, Ni elements acting as an anode catalyst and a conductor must be desirably connected to each other so as to reduce the internal resistance of the unit fuel cell. Referring to FIGS. 6A, 6B, and 7, a pore size, a pore size distribution, the Ni distribution, and connectivity of Ni elements of the anode-supported body are illustrated.

From FIGS. 6A and 6B, it can be seen that the connectivity of the Ni elements is excellent like a cylindrical anode-supported tube after the anode-supported body is reduced in hydrogen at 750° C. At this time, the connectivity of the Ni elements indicates electronic conductivity of the anode-supported body.

Additionally, from FIG. 7, it can be seen that porosity of the anode-supported body is 50.18% when the anode-supported body is pre-sintered at 1300° C., but the porosity is reduced to 42.08% after the anode-supported body is co-sintered at 1400° C. On the other hand, when the anode-supported body is reduced in hydrogen, the porosity of the anode-supported body is increased to 50.64% by about 9%, and a mean pore size of the anode-supported body is increased from 0.21 µm to 0.23 µm.

Figure 8:
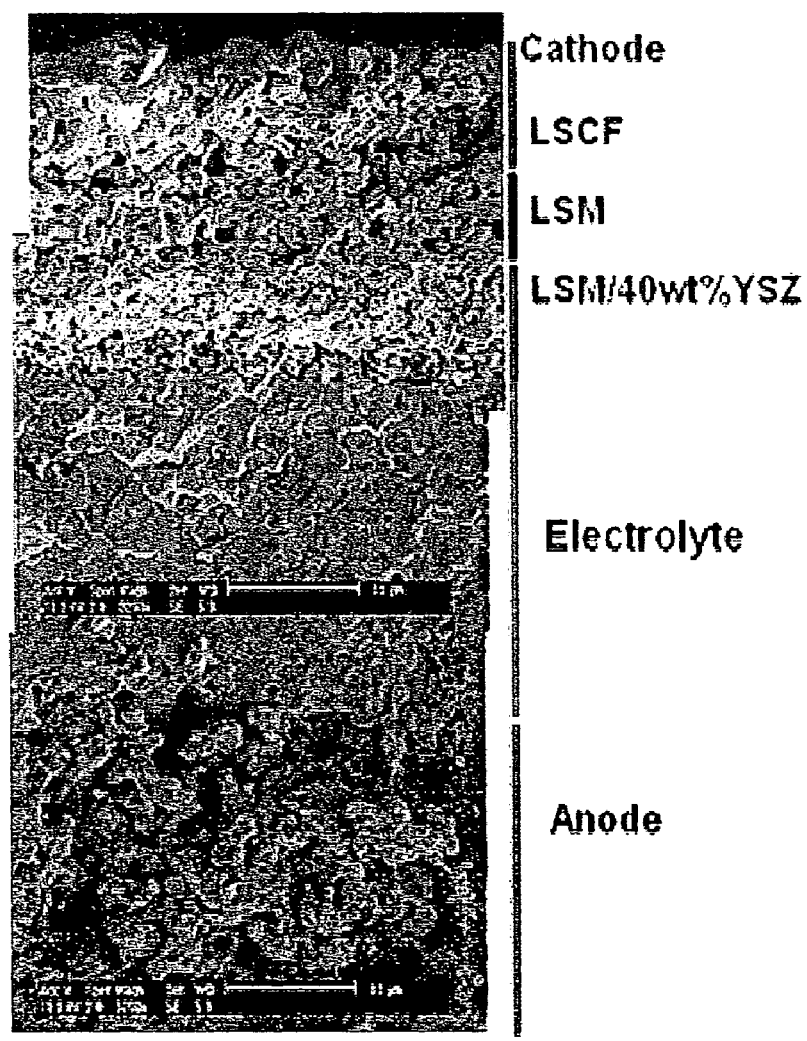
FIG. 8 is a picture illustrating a sectional structure of the unit fuel cell of the present invention.

FIG. 8 illustrates sections of an electrolyte layer and an air electrode layer formed according to a slurry dipping coating process. In this regard, the dense YSZ electrolyte layer with a thickness of about 20 to 25 µm is formed, and the air electrode layer includes a composite layer consisting of 40 wt % YSZ and LSM, an LSM layer, and an LSCF layer with excellent electronic and ionic conductivity. At this time, the composite layer consisting of 40 wt % YSZ and LSM is positioned at an interface between the electrolyte layer and the air electrode layer.

Figure 9:
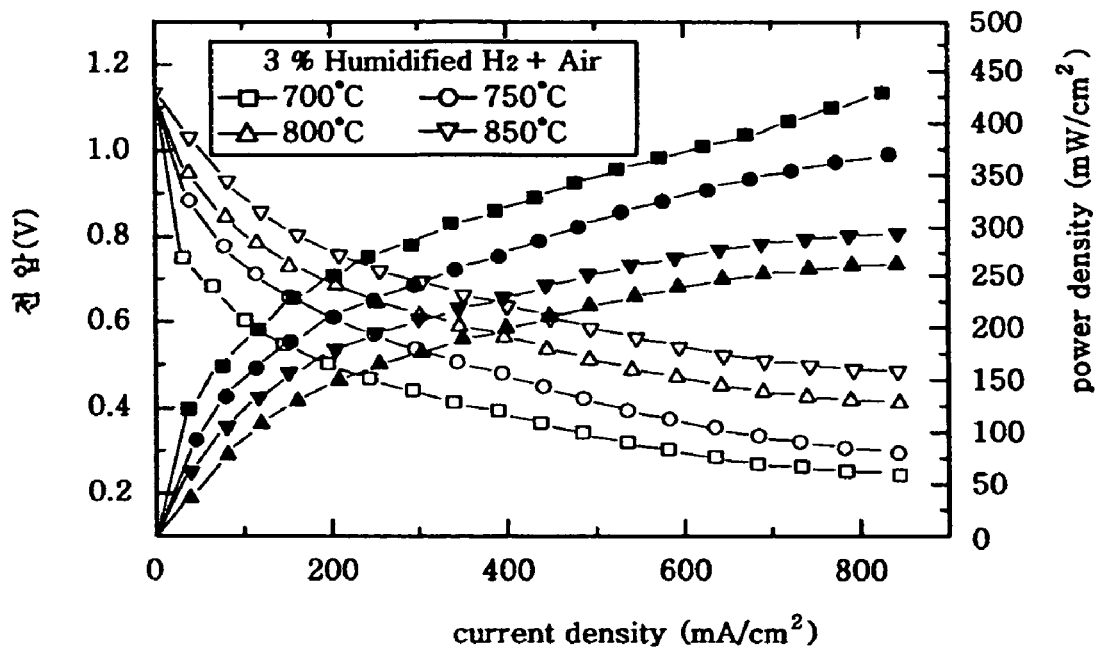
FIG. 9 is a performance graph of the unit fuel cell of the present invention, showing a voltage and a power density as a function of a current density for the unit fuel cell.

With reference to FIG. 9, there is illustrated an I-V performance curve, depending on an operation temperature of the unit fuel cell, of the unit fuel cell with an effective electrode area of 24.5 $cm^2$. In this regard, $H_2$ containing 3% $H_2O$ is fed as a fuel into the anode in a flow speed of 1.5 l/min and into the air electrode in a flow speed of 5 l/min. The internal resistance and polarization resistance of the unit fuel cell are reduced with the operation temperature of the unit fuel cell being increased, thereby improving the performance of the unit fuel cell.

Figure 10A:
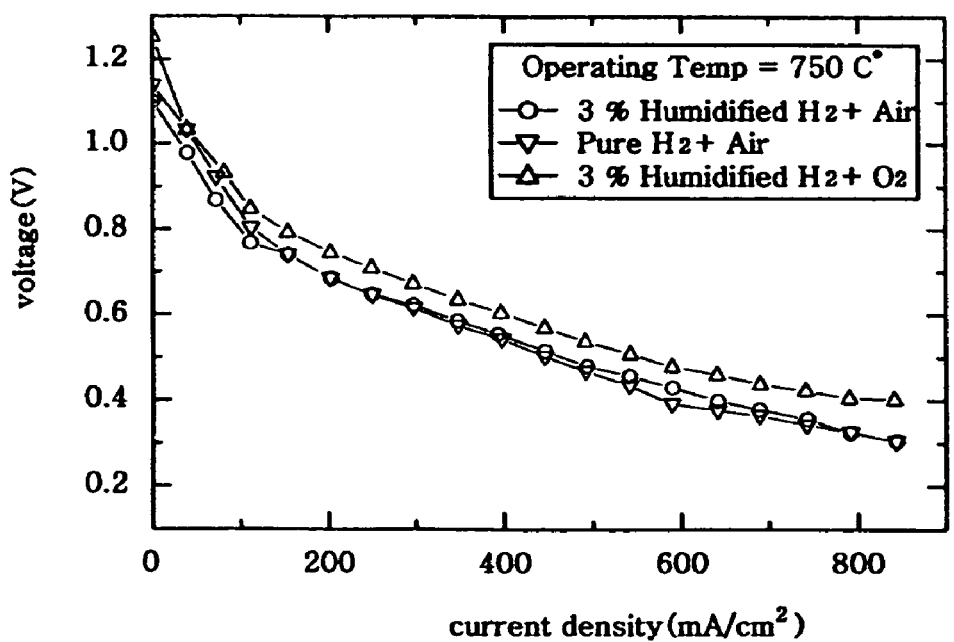
Figure 10B:
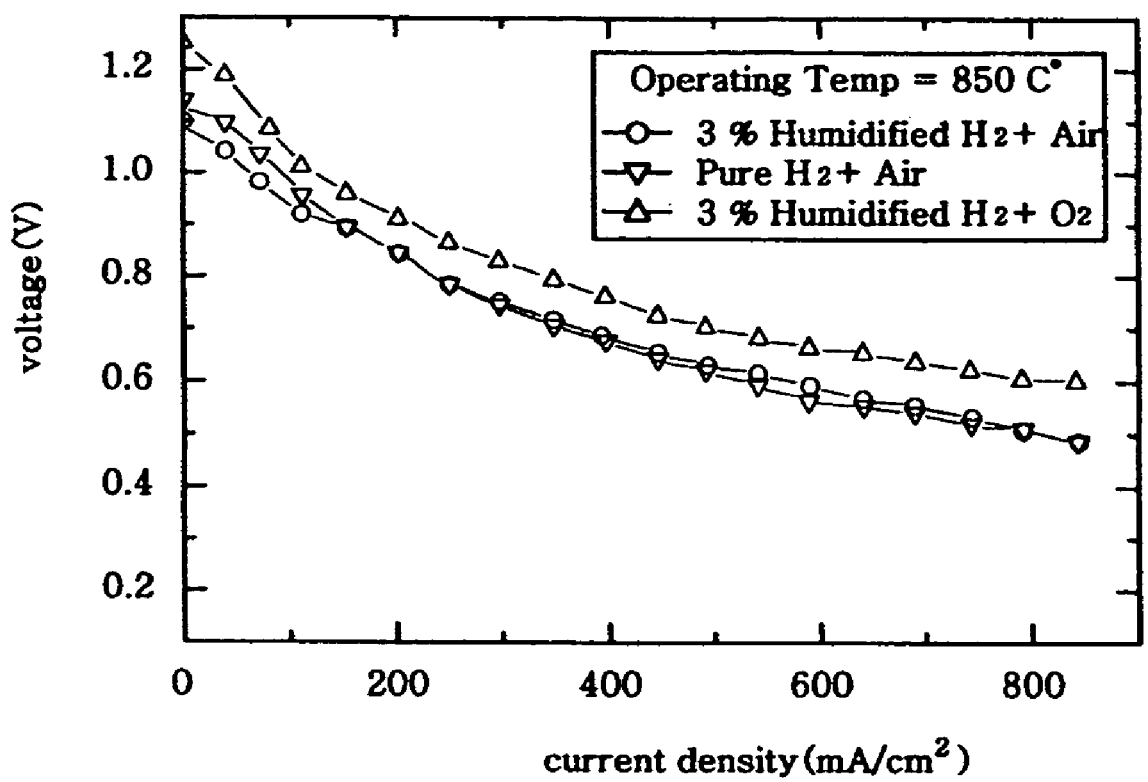

Further, from FIG. 9, it can be seen that the performance of the unit fuel cell is 300 $mW/cm^2$ (0.6 V, 500 $mA/cm^2$) at 800° C. Furthermore, in FIGS. 10A and 10B, there is illustrated the I-V performance curve of the unit fuel cell according to conditions of gas fed into the anode and air electrode. At this time, the unit fuel cell is operated at 750 and 850° C. in FIGS. 10A and 10B, respectively.

Figure 11:
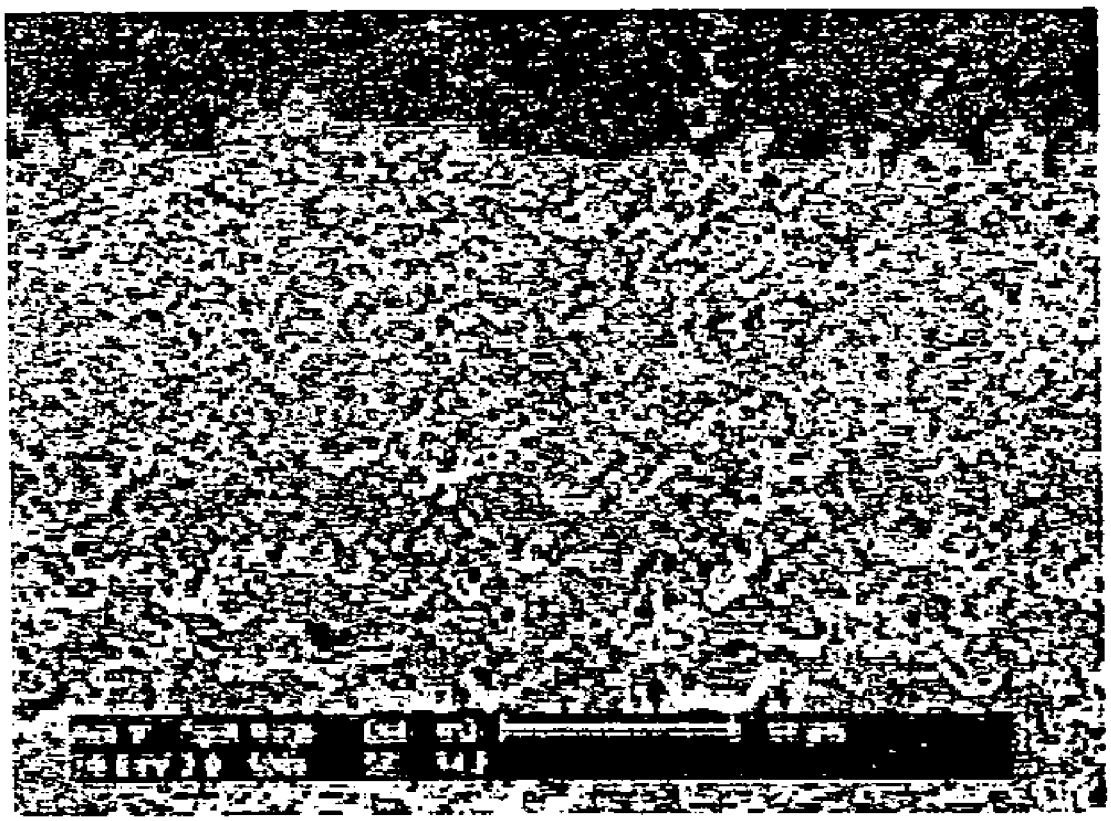
FIG. 11 is a picture illustrating a section of a connector coated on the supported tube according to the present invention.

Turning to FIG. 11, there is illustrated a section of a ceramic connector ($La_{0.75}Ca_{0.27}CrO_3$) coated on the anode-supported body according to an atmospheric plasma spray coating process. As shown in FIG. 11, a dense connector layer with a thickness of about 70 μm is formed on the anode-supported body, and has surface resistance of 8 mΩ $cm^2$ at 800° C. under hydrogen acting as the fuel gas and air. The above value of the surface resistance corresponds to an operational condition of an anode-supported flat-tubular solid oxide fuel cell stack, thus it can be seen that the connector layer can be applied to the anode-supported flat-tubular solid oxide fuel cell stack.

At this time, LSM is wet-coated on a commercial ferrite-based SUS 430 alloy for a metal bipolar plate to improve the oxidation resistance of the ferrite-based SUS 430 alloy, and sintered to produce the connector plate for electrically connecting the fuel cells to each other. The electric conductivity of the connector plate is evaluated in air.

After coated on the ferrite-based SUS 430 alloy, LSM is sintered under a gas containing oxygen so that the oxidation of metal elements in LSM is suppressed and an LSM coated layer stably forms a perovskite phase.

Additionally, a surface of the ferrite-based SUS 430 alloy is subjected to a short blast or a macro corrosion before LSM is coated on the ferrite-based SUS 430 alloy to desirably control the surface roughness of the ferrite-based SUS 430 alloy to improve a binding force between the ferrite-based SUS 430 alloy and LSM.

As described above, an anode-supported flat-tubular solid oxide fuel cell stack according to the present invention is advantageous in that a unit fuel cell constituting the anode-supported flat-tubular solid oxide fuel cell stack has advantages of a plate-type and a tube-type fuel cell, and includes an anode-supported tube, thus a connector plate is made of a relatively cheap metal because an operational temperature of the unit fuel cell is reduced without the performance reduction of the unit fuel cell. Further, the unit fuel cell with a large area is produced according to an easier process than the plate-type fuel cell, and a power density of the unit fuel cell is greatly improved in comparison with the tube-type fuel cell.

Other advantages are that the anode-supported flat-tubular solid oxide fuel cell stack is economically fabricated in commercial quantities unlike a conventional method of forming an electrolyte layer because cermet composed of metals and ceramics is used as a raw material of an anode acting as a supporter and a dense electrolyte layer is economically formed on the anode-supported tube according to a dipping-type wet slurry coating process.

Furthermore, production costs of a flat-tubular solid oxide fuel cell are reduced without the performance reduction of the flat-tubular solid oxide fuel cell because metal elements in the anode forms a metal net in a ceramic substance at predetermined operational temperatures of the fuel cell to improve the strength of the anode and the anode has a porous structure through which fuel gas smoothly penetrates.

It will thus been that the objects set forth above, among those made apparent from the preceding description, are efficiently attained and, since certain changes may be made in carrying out the above method and in the construction set forth without departing from the spirit and scope of the invention, it is intended that all matter contained in the accompanying drawings shall be interpreted as illustrative and not in a limiting sense.

What is claimed is:

1. A method of fabricating an anode-supported flat-tubular solid oxide fuel cell stack, comprising:

extruding and drying a paste, containing NiO-yttria-stabilized-zirconia (YSZ) powder;

pre-sintering the resulting paste at 1250 to 1400° C. to produce a supported tube;

coating a band-shaped organic layer along a length of a center of an upper plate of the supported tube, coating an electrolyte slurry on an external surface of the supported tube through a wet dipping process, and drying the electrolyte slurry;

removing the band-shaped organic layer from the supported tube and repeatedly degreasing the electrolyte slurry at 200 to 450°C.;

co-sintering the resulting supported tube at 1300 to 1500° C.;

coating perovskite powder in which Ca, Sr, Mg, Co, or Al is added to $LaCrO_3$ on a portion of the supported tube, on which the organic layer is removed, through a plasma spray coating process to form a ceramic connector on the supported tube;

coating another organic layer on the ceramic connector, preparing a mixed powder of $LaSrMnO_3$ and 20 to 50 wt % YSZ;

mixing 10 to 30 wt % of $LaSrMnO_3$ powder, 10 to 30 wt % of the mixed powder of $LaSrMnO_3$ and YSZ, and 10 to 30 wt % of $LaSrCoFeO_3$ powder with 50 to 75 wt % organic solvent and 5 to 40 wt % additive to produce three kinds of air electrode slurries;

sequentially coating slurry containing the $LaSrMnO_3$ powder, slurry containing the mixed powder of $LaSrMnO_3$ and YSZ, and slurry containing the $LaSrCoFeO_3$ powder on an electrolyte layer one time or more;

removing the organic layer from the ceramic connector;

sintering the air electrode slurries at 1150 to 1250° C. to accomplish a unit fuel cell;

forming a plurality of grooves, gas channels, and connector protrusions on metal plates made of a metal selected from the group consisting of a Fe—Cr based alloy, a Fe—Cr alloy containing $LaCrO_3$, $Y_2O_3$, or $La_2O_3$, a Cr alloy, and a Ni alloy;

polishing surfaces of the metal plates;

producing slurry for a connector plate containing $LaSrMnO_3$ or $La_{1-x}Ca_xCr_{1-y}O_3$, where x is greater than zero and less than or equal to 0.4 and y is greater than or equal to zero and less than or equal to 0.5;

dipping the metal plates into the slurry for the connector plate and repeatedly drying the metal plates one time or more to coat the slurry for the connector plate on the metal plates;

sintering the resulting metal plates at 1100 to 1350° C. under oxygen partial pressure of $10^{-10}$ to $10^{-3}$ atm to form ceramic coated layers on the metal plates to accomplish the connector plate; and stacking the connector plate and fuel cells to fabricate the anode-supported flat-tubular solid oxide fuel cell stack and connecting stack electrodes to the anode-supported flat-tubular solid oxide fuel cell stack.

2. The method as set forth in claim 1, wherein the paste for the supported tube comprises YSZ powder containing 30 to 60 vol. % Ni and 10 to 50 vol. % carbon powder acting as a pore forming agent, and 15 to 30 wt % distilled water, 5 to 20 wt % organic binding agent, 3 to 10 wt % plasticizer, and 1 to 7 wt % lubricant are added to a mixture of the carbon powder and YSZ powder based on a total amount of the mixture.

3. The method as set forth in claim 1, wherein the electrolyte slurry comprises 60 to 95 wt % organic solvent and 5 to 40 wt % YSZ powder, and 5 to 12 parts by weight of binding agent, 5 to 15 cc plasticizer, 1 to 3 cc homogenizing agent, and 1 to 3 cc dispersing agent are added to a mixture of the organic solvent and YSZ powder based on 100 g of the YSZ powder.

4. The method as set forth in claim 1, wherein the three kinds of air electrode slurries additionally comprise 50 to 75 wt % organic solvent, and 5 to 40 wt % additive.

5. The method as set forth in claim 1, wherein the slurry for the connector plate comprises 20 to 50 wt % $LaSrMnO_3$ or $La_{1-x}Ca_xCr_{1-y}O_3$ powder, 0.5 to 10 wt % binding agent, 0.2 to 2 wt % solvent, and 0.2 to 5 wt % additive.

6. The method as set forth in claim 1, wherein the slurry for the connector plate containing $LaSrMnO_3$ is sintered at 1100 to 1300° C. under oxygen partial pressure of $10^{-10}$ to $10^{-3}$ atm.

7. The method as set forth in claim 1, wherein the slurry containing $La_{1-x}Ca_xCr_{1-y}O_3$ is sintered 1150 to 1350° C. under oxygen partial pressure of $10^{-3}$ atm or lower.

* * * * *